United States Patent
Saijo et al.

(10) Patent No.: US 12,519,164 B2
(45) Date of Patent: Jan. 6, 2026

(54) CELL LAMINATE AND BATTERY MODULE

(71) Applicant: HONDA MOTOR CO., LTD., Tokyo (JP)

(72) Inventors: Yasuhiko Saijo, Saitama (JP); Yosuke Yoshizawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 642 days.

(21) Appl. No.: 17/952,800

(22) Filed: Sep. 26, 2022

(65) Prior Publication Data

US 2023/0099729 A1    Mar. 30, 2023

(30) Foreign Application Priority Data

Sep. 30, 2021  (JP) ................................. 2021-162013

(51) Int. Cl.
| | |
|---|---|
| *H01M 50/242* | (2021.01) |
| *H01M 50/121* | (2021.01) |
| *H01M 50/289* | (2021.01) |
| *H01M 50/291* | (2021.01) |

(52) U.S. Cl.
CPC ....... *H01M 50/242* (2021.01); *H01M 50/121* (2021.01); *H01M 50/289* (2021.01); *H01M 50/291* (2021.01); *H01M 2220/20* (2013.01)

(58) Field of Classification Search
CPC ............ H01M 50/242; H01M 50/289; H01M 50/291
See application file for complete search history.

(56) References Cited

U.S. PATENT DOCUMENTS

| | | |
|---|---|---|
| 2011/0183183 A1 | 7/2011 | Grady et al. |
| 2015/0200418 A1 | 7/2015 | Grady et al. |
| 2019/0088979 A1 | 3/2019 | Grady et al. |
| 2020/0303689 A1 | 9/2020 | Kinno et al. |
| 2021/0376421 A1* | 12/2021 | Matsushita ......... H01M 50/291 |

FOREIGN PATENT DOCUMENTS

| | | |
|---|---|---|
| JP | 2005-302698 A | 10/2005 |
| JP | 2013-518394 A | 5/2013 |
| JP | 2014-002907 A | 1/2014 |
| JP | 2020-061210 A | 4/2020 |
| JP | 2020-155356 A | 9/2020 |
| JP | 2021-077583 A | 5/2021 |

OTHER PUBLICATIONS

Dec. 3, 2024 Japanese Office Action translation issued for related JP Application No. 2021-162013.

* cited by examiner

*Primary Examiner* — Jonathan G Jelsma

(74) *Attorney, Agent, or Firm* — Paratus Law Group, PLLC

(57) ABSTRACT

A cell laminate includes a plurality of battery cells which are laminated. The plurality of battery cells are laminated in a first direction and are laminated to be offset to one side in a second direction orthogonal to the first direction. An elastic body is arranged between adjacent battery cells of the plurality of battery cells. The elastic body is configured so that when the battery cells expand, the battery cells are displaced in the first direction and are displaced to the other side in the second direction.

6 Claims, 8 Drawing Sheets

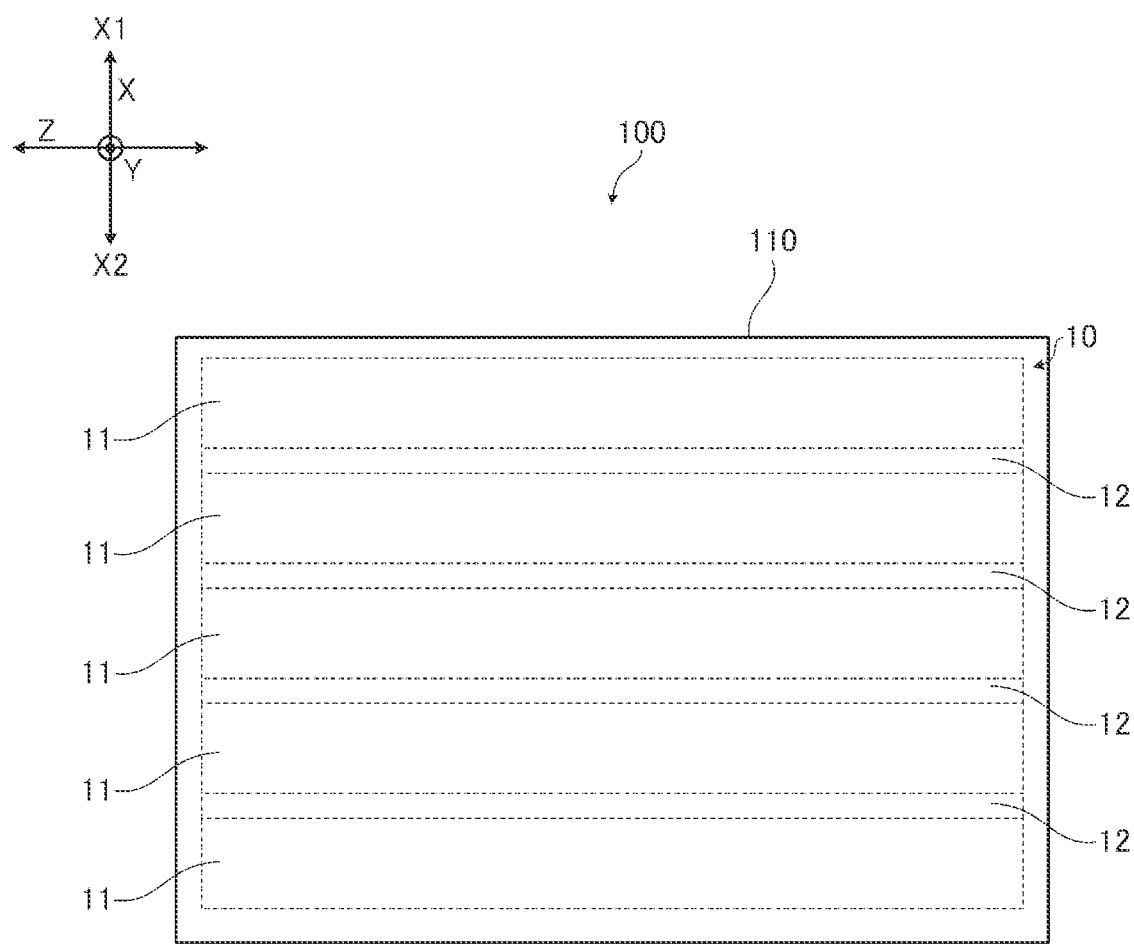

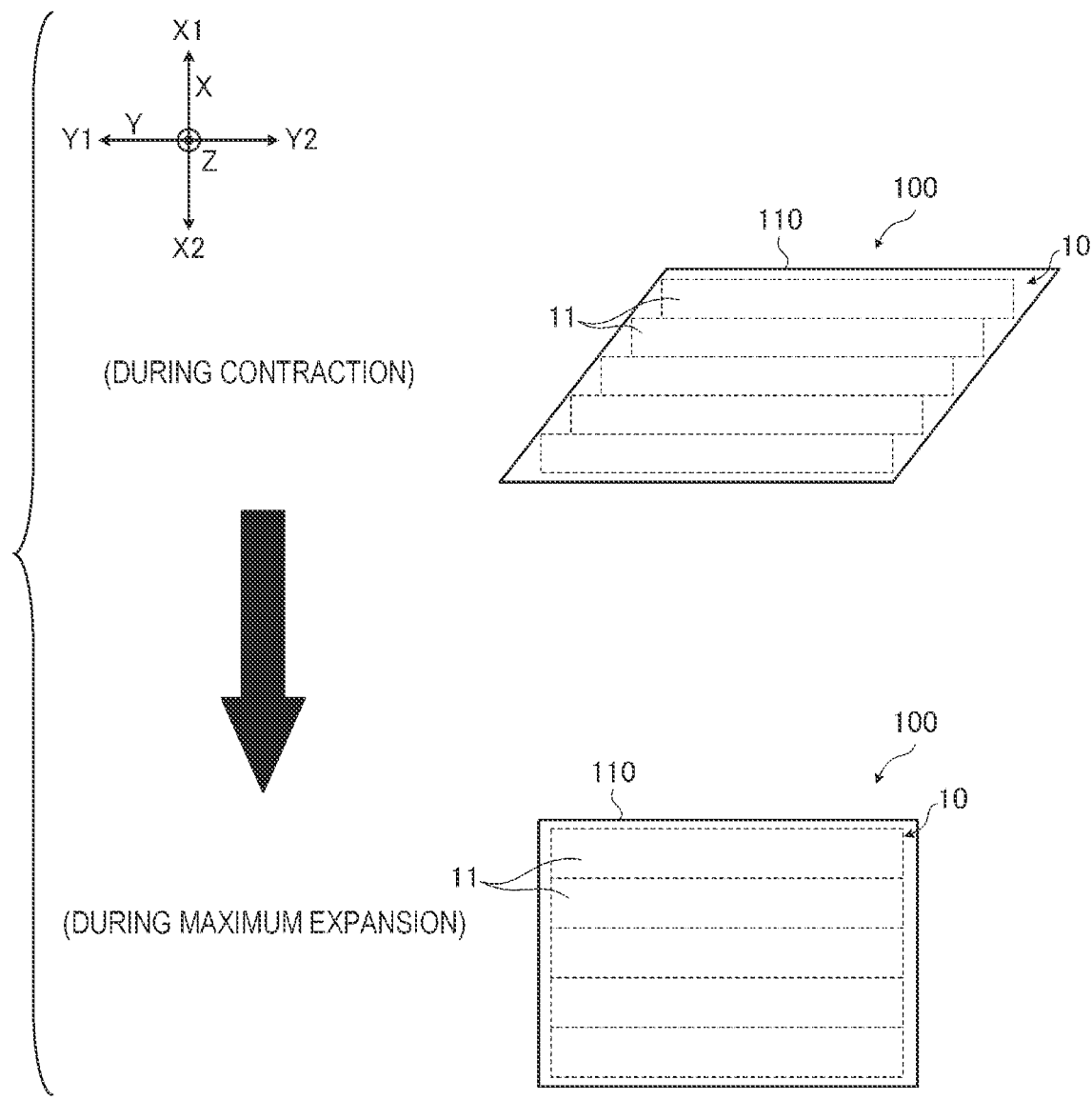

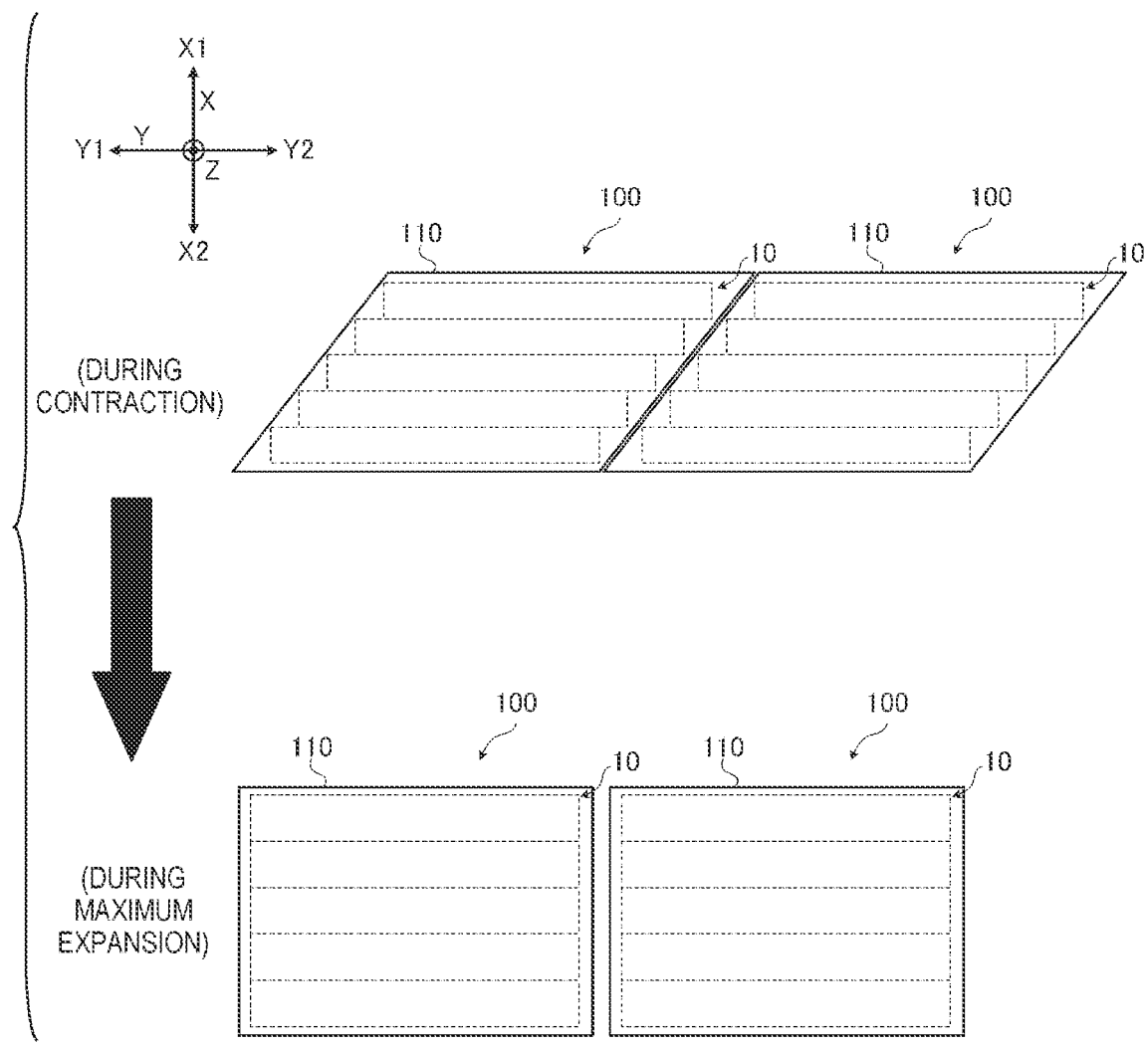

CELL LAMINATE AND BATTERY MODULE

CROSS-REFERENCE TO RELMED APPLICATIONS

This application is based on and claims priority under 35 USC 119 from Japanese Patent Application No. 2021-162013 filed on Sep. 30, 2021.

TECHNICAL FIELD

The present disclosure relates to a cell laminate and a battery module including the cell laminate.

BACKGROUND ART

In recent years, as a specific measure against global climate change, efforts toward realization of a low-carbon society or a decarbonized society are active. Even for a moving object equipped with a drive source such as a vehicle, there is a strong request for reduction of $CO_2$ emissions, and electrification of the drive source rapidly progresses. For example, as the vehicle, a vehicle including an electric motor as a drive source of the vehicle and a battery as a secondary battery capable of supplying power to the electric motor, such as an electrical vehicle or a hybrid electrical vehicle, is developed. Such a battery generally includes a cell laminate including a plurality of laminated battery cells.

The battery cell expands or contracts depending on a usage condition (for example, a state of charge). Particularly, when a so-called all-solid-state battery is used for the battery cell, the battery cell expands and contracts more obviously. Therefore, JP-A-2020-155356 discloses a technique in which in a case which accommodates a laminate including all-solid-state battery cells, by providing two contact portions which are in contact with both ends of the laminate in a laminating direction, respectively, and two spring structures which connect the two contact portions, when the laminate expands, the spring structures are expanded so that a major axis of the case extends to a thickness of the expanded laminate, so that excessively high pressure is not applied to the laminate.

Considering that the cell laminate is mounted on any machine such as a vehicle, it is desired to reduce a dimensional change of the cell laminate in the laminating direction of the battery cells even when the battery cells expand, and there is room for improvement in this regard in the related art.

SUMMARY

The present disclosure provides a technique capable of reducing the dimensional change of the cell laminate in the laminating direction of the battery cells even when the battery cells expand.

Aspect of the present disclosure relates to a cell laminate comprising a plurality of battery cells which are laminated, in which:
  the plurality of battery cells are laminated in a first direction and are laminated to be offset to one side in a second direction orthogonal to the first direction;
  an elastic body is arranged between adjacent battery cells of the plurality of battery cells; and
  the elastic body is configured so that when the battery cells expand, the battery cells are displaced in the first direction and are displaced to the other side in the second direction.

Further, aspect of the present disclosure relates to a battery module, including:
  the cell laminate described above; and
  a case which accommodates the cell laminate, in which the case has the parallelogram shape as viewed from the third direction and is configured so that when the battery cells expand, the battery cells are displaced in the first direction and are displaced to the other side in the second direction.

According to the present disclosure, it is possible to reduce a dimensional change of the cell laminate in the laminating direction of the battery cells even when the battery cells expand.

BRIEF DESCRIPTION OF DRAWINGS

FIG. 6 is a view of the battery module 100 including the cell laminate 10 as viewed from the Y direction.

FIG. 7 is a diagram illustrating deformation examples of the battery module 100 due to expansion and contraction of the battery cells 11.

FIG. 8 is a diagram illustrating other deformation examples of the battery module 100 due to expansion and contraction of the battery cells 11.

DESCRIPTION OF EMBODIMENTS

Figure 1:
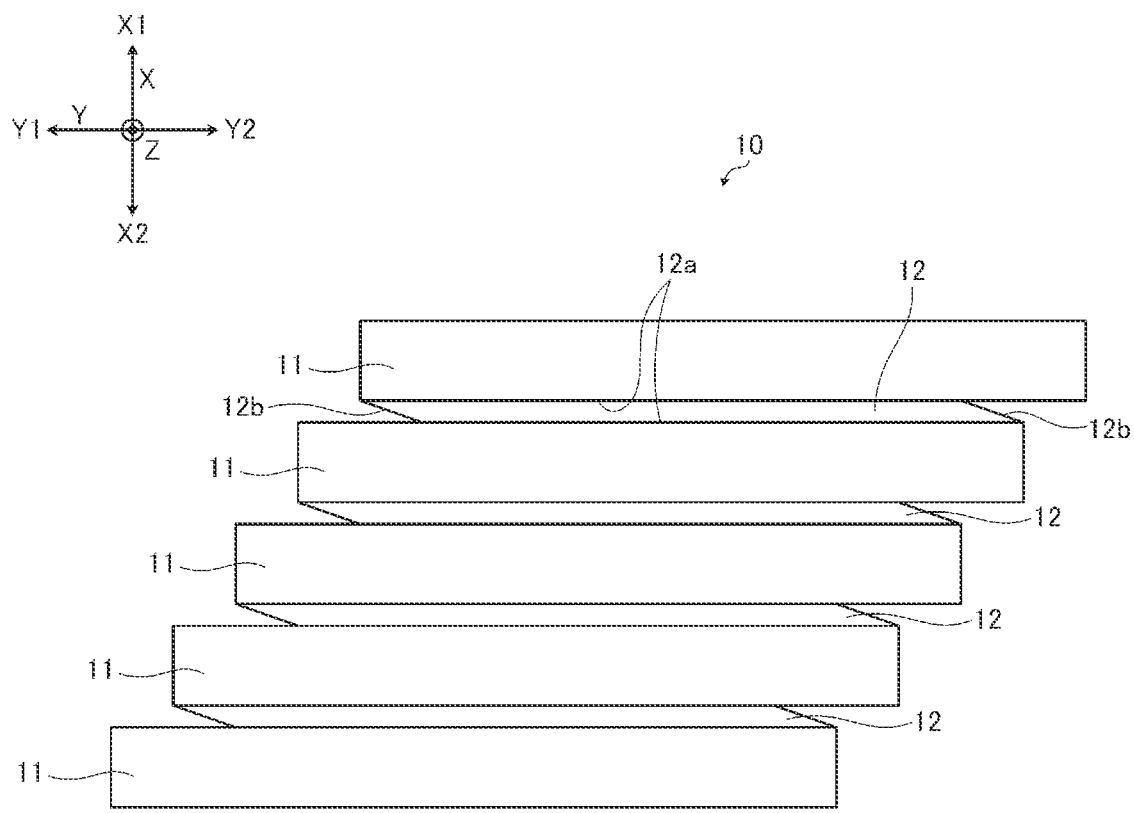
FIG. 1 is a view of a cell laminate 10 as viewed from a Z direction.

Hereinafter, an embodiment of a cell laminate and a battery module including the cell laminate of the present disclosure will be described in detail with reference to the drawings. It should be noted that the drawings are viewed in directions of reference numerals.

Cell Laminate

Figure 2:
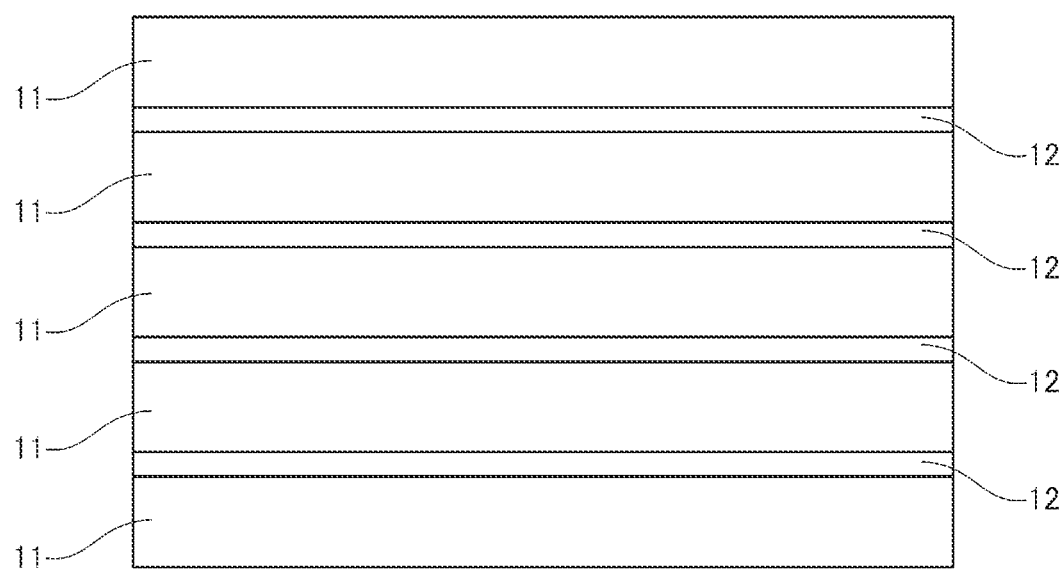
FIG. 2 is a view of the cell laminate 10 as viewed from a Y direction.

As illustrated in FIGS. 1 and 2, a cell laminate 10 of the present embodiment includes a plurality of battery cells 11 arranged so as not to come into contact with each other, and an elastic body 12 arranged between adjacent battery cells 11 of the plurality of battery cells 11. Here, the elastic body 12 is provided in a state of being fixed with respect to the battery cell 11, such as by being adhered to the battery cell 11.

The battery cell 11 is constituted using, for example, an all-solid-state battery. Although not illustrated, the all-solid-state battery includes a positive electrode for the all-solid-state battery, a negative electrode for the all-solid-state battery, and a solid electrolyte arranged between the positive electrode for the all-solid-state battery and the negative electrode for the all-solid-state battery. Charging and discharging of the all-solid-state battery are performed by exchanging lithium ions between the positive electrode for the all-solid-state battery and the negative electrode for the all-solid-state battery via the solid electrolyte. The solid electrolyte is not particularly limited as long as it has lithium ion conductivity and insulating properties, and a material generally used for an all-solid-state lithium ion battery can be used. For example, examples of the solid electrolyte include sulfide solid electrolyte materials, oxide solid electrolyte materials, inorganic solid electrolytes such as lithium-containing salts, polymer-based solid electrolytes such as polyethylene oxide-based solid electrolyte, and gel-based solid electrolytes containing lithium-containing salts or lithium-ion conductive ionic liquid. A form of the solid electrolyte material is not particularly limited, and examples thereof include a particulate form.

In the cell laminate 10, the plurality of battery cells 11 are laminated in a first direction and are laminated to be offset to one side in a second direction orthogonal to the first direction. That is, the first direction is a laminating direction of the battery cells 11 in the cell laminate 10. In the following, the first direction is also referred to as "X direction", one side in the X direction is also referred to as "X1 direction", and the other side in the X direction is also referred to as "X2 direction". The second direction orthogonal to the first direction (that is, the X direction) is also referred to as "Y direction", one side in the Y direction is also referred to as "Y1 direction", and the other side in the Y direction is also referred to as "Y2 direction". A third direction orthogonal to the first direction (that is, the X direction) and the second direction (that is, the Y direction) is also referred to as "Z direction".

The elastic body 12 is a cushion material having a parallelogram shape formed by a pair of bases 12a extending in the Y direction and a pair of hypotenuses 12b extending in the Y1 direction toward the X1 direction, when viewed from the Z direction. The elastic body 12 is made of an elastic material such as resin and rubber. Examples of the resin include silicone-based, fluorine-based, urethane-based, amide-based, olefin-based, styrene-based, ester-based, and vinyl chloride-based elastomers. The urethane-based, amide-based, olefin-based, and ester-based elastomers are hard and easy to ensure a load surface pressure, and the amide-based, styrene-based, urethane-based, ester-based, and vinyl chloride-based elastomers have a high coefficient of restitution. The urethane-based elastomer is most preferable since it is lower in cost than rubber and other elastomers, can easily ensure a load surface pressure, and have a high coefficient of restitution. By using an elastomer for the elastic body 12, expansion or contraction of the battery cell 11 can be appropriately absorbed. By appropriately selecting a material of the elastomer in consideration of a restoring force of the elastic body 12, an environmental temperature of environment in which the elastic body 12 is used, and the like, it is possible to apply an appropriate pressure to the expanded battery cell 11 and to make the elastic body 12 inexpensively and easily.

Figure 3:
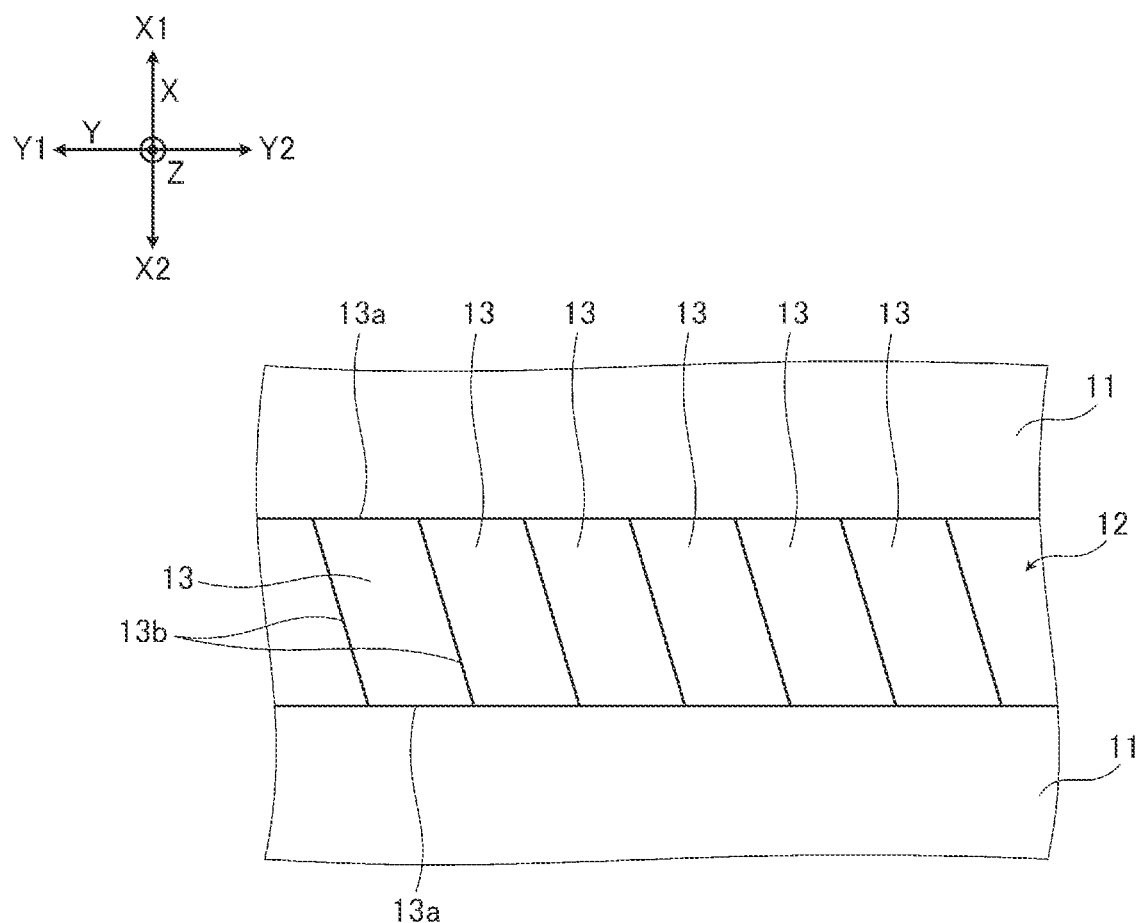
FIG. 3 is an enlarged view of an elastic body 12 of the cell laminate 10 as viewed from the Z direction.

Specifically, as illustrated in FIG. 3, the elastic body 12 is constituted by laminating, in the Y direction, a plurality of elastic body blocks 13 having a parallelogram shape formed by a pair of bases 13a extending in the Y direction and a pair of hypotenuses 13b extending in the Y1 direction toward the X1 direction. Therefore, the elastic body 12 having the above-mentioned parallelogram shape can be easily formed. For the elastic body block 13, for example, the above-mentioned elastomers can be used. Therefore, the elastic body block 13 can be made inexpensively and easily, and a manufacturing cost of the cell laminate 10 can be reduced.

According to the cell laminate 10 configured as described above, as illustrated in FIG. 4, when the battery cells 11 expand, the battery cells 11 are displaced in the X direction and also in the Y2 direction (refer to an arrow 400 in FIG. 4).

Specifically, for example, restraint members (for example, an end plate or a side wall of a case which accommodates the cell laminate 10) are provided on both sides of the cell laminate 10 in the X direction, and the cell laminate 10 receives a reaction force from the restraint members when the cell laminate 10 expands in the X direction. Therefore, when the battery cells 11 expand, the elastic body 12 arranged between the battery cells 11 is crushed by that amount. Therefore, it is possible to prevent an excessively high pressure from being applied to the battery cells 11 even when the battery cells 11 expand. Further, the restoring force of the elastic body 12 can apply an appropriate pressure to the battery cells 11 to restrain the battery cells 11.

When the elastic body 12 is crushed in this way, the battery cells 11 are displaced in the X direction and also in the Y2 direction. That is, the elastic body 12 functions as a displacement direction guiding portion which guides the battery cells 11 to be displaced in the Y2 direction by deforming with the expansion of the battery cells 11.

Figure 4:
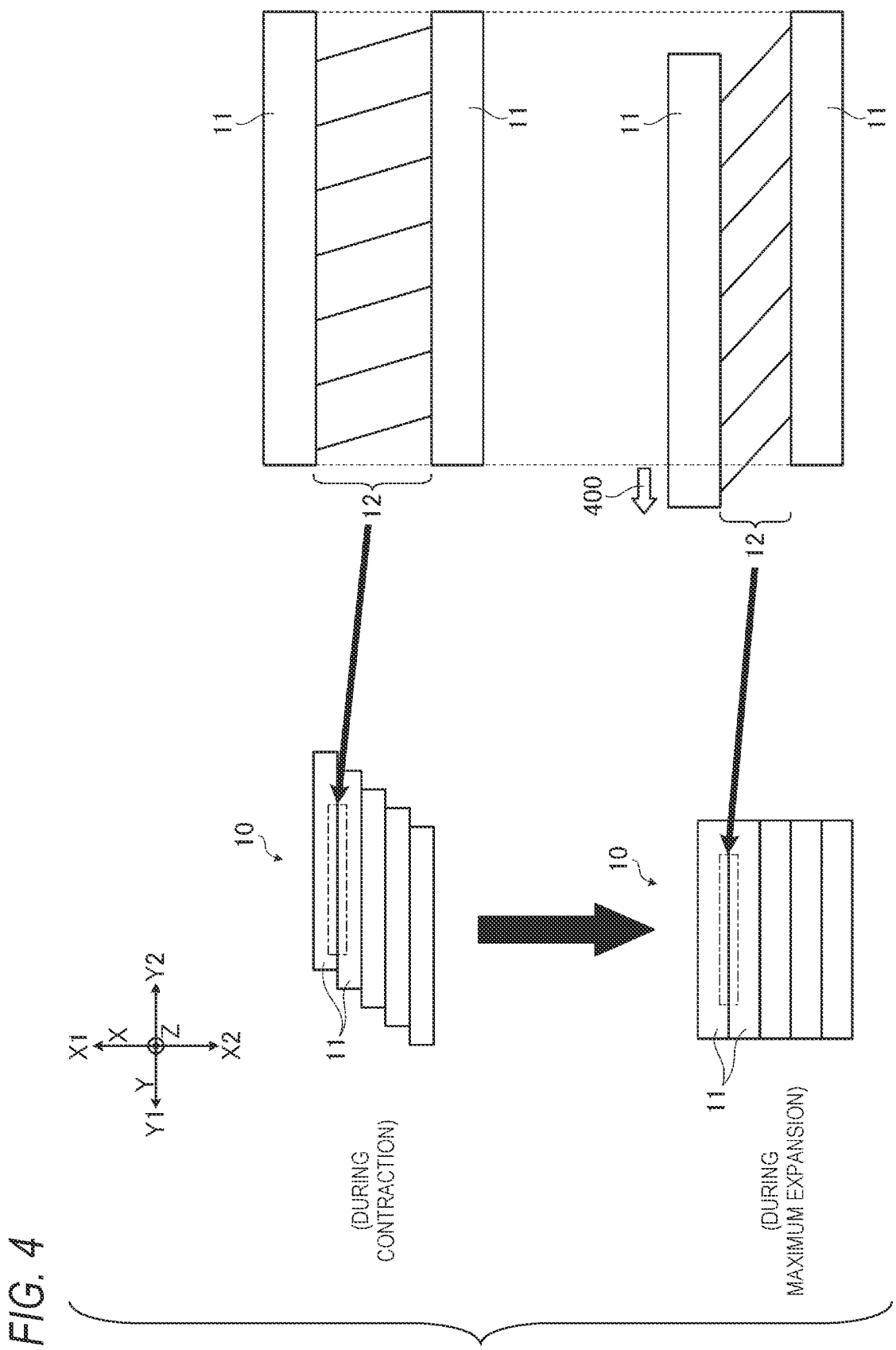
FIG. 4 is a diagram illustrating displacement examples of battery cells 11 due to expansion and contraction of the battery cells 11 in the cell laminate 10.

As illustrated in FIG. 4, the cell laminate 10 is configured so that when the battery cells 11 are maximally expanded, the offset between the battery cells 11 in the Y direction becomes substantially zero, and the battery cells 11 are aligned straight in the X direction. In other words, the cell laminate 10 is configured so that the battery cells 11 are offset from each other in the Y direction when the battery cells 11 are not maximally expanded.

As described above, according to the cell laminate 10, the battery cells 11 are displaced in the X direction and also in the Y2 direction due to the deformation of the elastic body 12 caused by the expansion of the battery cells 11. As a result, the displacement of the battery cells 11 in the X direction can be reduced as compared with a case where the expanded battery cells 11 are not displaced in the Y2 direction. Therefore, it is possible to reduce a dimensional change of the cell laminate 10 in the laminating direction (that is, the X direction) of the battery cells 11 even when the battery cells 11 expand according to a usage condition (for example, a state of charge). By reducing the dimensional change of the cell laminate 10 in the laminating direction of the battery cells 11, it becomes easy to mount the cell laminate 10 on any machine such as a vehicle.

According to the cell laminate 10, even when the battery cells 11 expand and contract, the displacement thereof can be efficiently absorbed by the deformation of the elastic body 12, so that a volume (dead space) occupied by components other than the battery cells 11 in the cell laminate 10 can be reduced, and an energy density of the cell laminate 10 can be improved.

Battery Module

Next, an example of a battery module including, the above-mentioned cell laminate 10 will be described. In the following, the same parts as those described above will be designated by the same reference numerals, and the description thereof will be omitted or simplified as appropriate.

Figure 5:
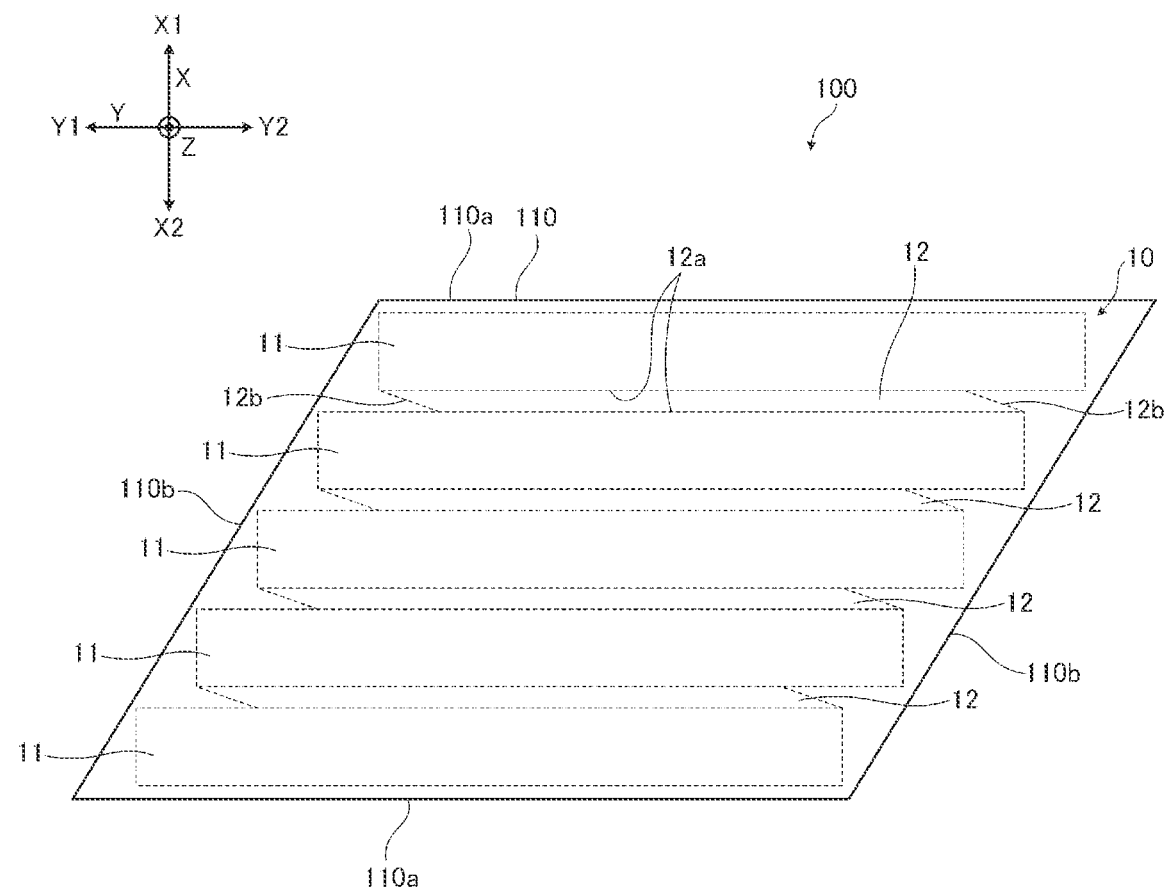
FIG. 5 is a view of a battery module 100 including the cell laminate 10 as viewed from the Z direction.

As illustrated in FIGS. 5 and 6, a battery module 100 includes the cell laminate 10 and a case 110 which accommodates the cell laminate 10. The case 110 has a parallelogram shape formed by a pair of bases 110a, extending in the Y direction and a pair of hypotenuses 110b extending in the Y2 direction toward the X1 direction, when viewed from the 7 direction. As a result, as illustrated in FIG. 5, the shape of the case 110 and the shape of the cell laminate 10 as viewed from the Z direction can be matched, and a dead space generated when the cell laminate 10 is accommodated in the case 110 can be reduced.

The case 110 is constituted by using, for example, a laminated film in which a resin layer and a metal layer are laminated, and is deformed with the displacement of the battery cells 11 of the accommodated cell laminate 10. In other words, the case 110 does not hinder the displacement of the battery cells 11 of the accommodated cell laminate 10.

Therefore, as illustrated in FIG. 7, even in the battery module 100 in which the cell laminate 10 is accommodated in the case 110, when the battery cells 11 expand, the battery cells 11 are displaced in the X direction and also in the Y2 direction, As a result, the displacement of the battery cells 11 in the X direction can be reduced as compared with the case where the expanded battery cells 11 are not displaced in the Y2 direction. Therefore, it is possible to reduce a dimensional change of the battery module 100 in the laminating direction (that is, the X direction) of the battery cells 11 even when the battery cells 11 expand according to a usage condition (for example, a state of charge). By reducing the dimensional change of the battery module 100 in the laminating direction of the battery cells 11, it becomes easy to mount the battery module 100 on any machine such as a vehicle.

As illustrated in FIG. 8, for example, when a plurality of battery modules 100 are aligned in the Y direction and controlled so that usage conditions and the like of the battery module 100 are matched with each other, each battery module 100 teach cell laminate 10) can be similarly deformed, so that a plurality of battery modules 100 can be provided by effectively utilizing a limited space. Therefore, it is possible to improve an energy density of, for example, a battery pack or the like in which a plurality of battery modules 100 are aligned in the Y direction.

Although one embodiment of the present disclosure has been described above with reference to the accompanying drawings, it is needless to say that the present disclosure is not limited to such an embodiment. It will be apparent to those skilled in the art that various changes and modifications may be conceived within the scope of the claims. It is also understood that the various changes and modifications belong to the technical scope of the present invention. In addition, the constituent elements in the above embodiment may be combined as desired without departing from the spirit of the present disclosure.

For example, in the above-mentioned embodiment, the example in which the elastic body 12 is constituted by laminating the plurality of elastic body blocks 13 in the Y direction has been described, but the present disclosure is not limited thereto. For example, the elastic body 12 may be constituted by one cushion material having a parallelogram shape, or the elastic body 12 may be constituted by a plate material or the like formed in a substantially Z shape having a pair of bases extending in the Y direction when viewed from the Z direction and one side connecting the pair of bases and extending in the Y1 direction toward the X1 direction.

Further, in the above-mentioned embodiment, the example in which the battery cell 11 is constituted by an all-solid-state battery has been described, but the present disclosure is not limited thereto. The battery cell 11 may be constituted by using any kind of secondary battery which expands or contracts depending on a usage condition, such as a lithium ion battery At least the following matters are described in the present description. in parentheses, corresponding constituent elements and the like in the above embodiment are shown as an example, and the present invention is not limited thereto.

(1) A cell laminate (cell laminate 10) including a plurality of battery cells (battery cells 11) which are laminated, in which:
  the plurality of battery cells are laminated in a first direction (X direction) and are laminated to be offset to one side in a second direction (Y direction) orthogonal to the first direction:
  an elastic body (elastic body 12) is arranged between adjacent battery cells of the plurality of battery cells; and
  the elastic body is configured so that when the battery cells expand, the battery cells are displaced in the first direction and are displaced to the other side in the second direction.

According to (1), the battery cells can be displaced in the second direction due to deformation of the elastic body caused by expansion of the battery cells. Therefore, the displacement of the expanded battery cells in the first direction can be reduced as compared. with a case where the expanded battery cells are not displaced in the second direction. As a result, even when the battery cells expand, it is possible to reduce a dimensional change of the cell laminate in a laminating direction of the battery cells.

(2) The cell laminate according to (1), in which
  as viewed from a third direction orthogonal to the first direction and the second direction, the elastic body has a parallelogram shape formed by a pair of bases (bases 12a) extending in the second direction and a pair of hypotenuses (hypotenuses 12b) extending to the one side in the second direction toward the first direction.

According to (2), the battery cells can be displaced in the second direction due to the deformation of the elastic body caused by the expansion of the battery cells.

(3) The cell laminate according to (2), in which
  the elastic body includes a plurality of elastic body blocks (elastic body blocks 13) having the parallelogram shape and laminated in the second direction.

According to (3), an elastic body having a parallelogram shape can be easily formed.

(4) The cell laminate according to (2), in which
  the elastic body is made of a cushion material.

According to (4), the elastic body can be made inexpensively and easily, and a manufacturing cost of the cell laminate can be reduced.

(5) The cell laminate according to (4), in which
  the cushion material is an elastomer.

According to (5), the expansion or contraction of the battery cells can be appropriately absorbed.

(6) The cell laminate according to (5), in which
  the elastomer is any one of a silicone-based elastomer, a fluorine-based elastomer, urethane-based elastomer, an amide-based elastomer, an olefin-based elastomer, a styrene-based elastomer, an ester-based elastomer, and a vinyl chloride-based elastomer.

According to (6), the expansion or contraction of the battery cells can be more appropriately absorbed.

(7) A battery module (battery module 100), including:
  the cell laminate according to any one of (2) to (6); and
  a case (case 110) which accommodates the cell laminate, in which
  the case has the parallelogram shape as viewed from the third direction and is configured so that when the battery cells expand, the battery cells are displaced in the first direction and are displaced to the other side in the second direction.

According to (7), it is possible to reduce a dimensional change of the battery module in the laminating direction of the battery cells even when the battery cells expand.

The invention claimed is:

1. A cell laminate comprising a plurality of battery cells which are laminated, wherein:
   the plurality of battery cells are laminated in a first direction and are laminated to be offset to one side in a second direction orthogonal to the first direction;
   an elastic body is arranged between adjacent battery cells of the plurality of battery cells;
   the elastic body is configured so that when the battery cells expand, the battery cells are displaced in the first direction and are displaced to another side opposite to the one side in the second direction; and
   as viewed from a third direction orthogonal to the first direction and the second direction, the elastic body has a parallelogram shape formed by a pair of bases extending in the second direction and a pair of hypotenuses extending to the one side in the second direction toward the first direction.

2. The cell laminate according to claim 1, wherein the elastic body includes a plurality of elastic body blocks having the parallelogram shape and laminated in the second direction.

3. The cell laminate according to claim 1, wherein the elastic body is made of a cushion material.

4. The cell laminate according to claim 3, wherein the cushion material is an elastomer.

5. The cell laminate according to claim 4, wherein the elastomer is any one of a silicone-based elastomer, a fluorine-based elastomer, a urethane-based elastomer, an amide-based elastomer, an olefin-based elastomer, a styrene-based elastomer, an ester-based elastomer, and a vinyl chloride-based elastomer.

6. A battery module, comprising:
   the cell laminate according to claim 1; and
   a case which accommodates the cell laminate, wherein the case has the parallelogram shape as viewed from the third direction and is configured so that when the battery cells expand, the battery cells are displaced in the first direction and are displaced to the other side in the second direction.

* * * * *